Figure 1:
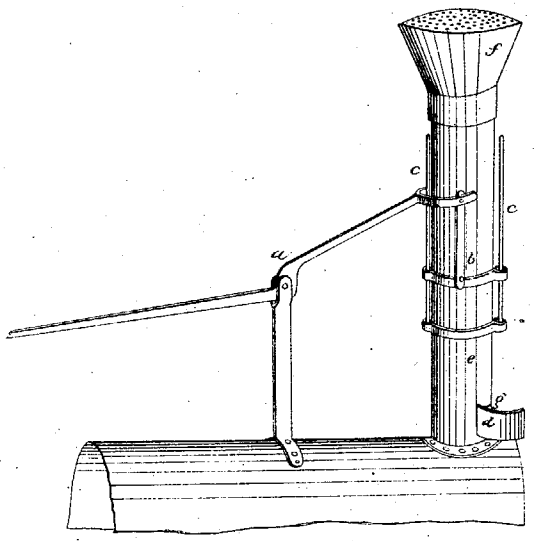
Figure 2:
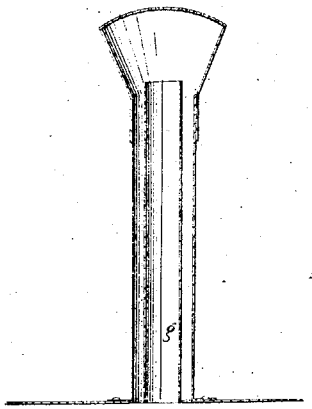

9173X

H. C. Miatt,

Spark Arrester.

Patented Oct. 15, 1835.

Oct. 15. 1835

Haut C. Wiatt 9173X
Letters Patent

The Schedule referred to in these Letters Patent and making part of the same containing a description in the words of the said Haut C. Wiatt himself of his improvement in an apparatus to be used in the Chimneys of Locomotive Steam Engines to prevent the sparks from the fuel flying out and accumulating in the caps &c.

---

Be it known that I, Haut C. Wiatt, of Weldon Halifax Co. North Carolina have made an improvement in the useful arts, being an apparatus to be used in the chimneys of locomotive Steam engines to prevent the sparks from the fuel flying out and accumulating in the caps, also a method of lowering the top of the chimney so as to suffer it to pass under bridges &c which is described as follows. To prevent the sparks from the fire flying out or accumulating in the cap. I construct two or pipes of sheet iron or other suitable metal. the outer pipe about 4 inches larger in diameter than the inner, forming an opening between them for the sparks to descend in and lodge upon a floor or chamber of suitable height at which there will be a door from whence the sparks or ashes will be removed. On the top of these tubes or chimneys is a cap made of any required shape perforated with holes to admit the smoke to escape but not the sparks. To lower the top of the chimney so as to pass under bridges &c I make the top of the chimney in two parts the one to slide over the other. There are three ears with upright rods rivitted on the outer part of the chimney &c upon which the upper part slides up and down and to raise and lower the upper part. I use a lever or brake one part attached by pins to the chimney and the supports resting on the boiler. What I claim as my invention and desire to be secured by Letters Patent consists in making one or more tubes placed inside of another tube by which the sparks descend into a chamber or floor and there removed removed which prevents them from accumulating and choking the chimney. Also the sliding top for passing under bridges &c.

Witnesses

Clement T. Coolo — H. C. Wiatt

S. A. Elliot (October 15. 1835) [396 ms (Drawing) 37, 50